United States Patent
Nagl et al.

(10) Patent No.: US 12,403,846 B2
(45) Date of Patent: Sep. 2, 2025

(54) DECORATIVE PART AND METHOD FOR PRODUCING SAME

(71) Applicant: JOYSONQUIN Automotive Systems GmbH, Rutesheim (DE)

(72) Inventors: Matthias Nagl, Gottingen (DE); Ulrich Vetter, Gottingen (DE)

(*) Notice: Subject to any disclaimer, the term of this patent is extended or adjusted under 35 U.S.C. 154(b) by 213 days.

(21) Appl. No.: 17/877,998

(22) Filed: Jul. 31, 2022

(65) Prior Publication Data

US 2023/0038235 A1 Feb. 9, 2023

(30) Foreign Application Priority Data

Aug. 3, 2021 (DE) .......................... 102021120154.3

(51) Int. Cl.
| | |
|---|---|
| *B23K 26/354* | (2014.01) |
| *B60Q 3/54* | (2017.01) |
| *B60Q 3/62* | (2017.01) |
| *B60R 13/02* | (2006.01) |
| B23K 101/00 | (2006.01) |
| B23K 101/34 | (2006.01) |

(52) U.S. Cl.
CPC ............ *B60R 13/02* (2013.01); *B23K 26/354* (2015.10); *B60Q 3/54* (2017.02); *B60Q 3/62* (2017.02); *B23K 2101/006* (2018.08); *B23K 2101/34* (2018.08)

(58) Field of Classification Search
CPC ........... B23K 26/354; B60Q 3/54; B60Q 3/62
USPC ....................................................... 362/488
See application file for complete search history.

(56) References Cited

U.S. PATENT DOCUMENTS

| | | | |
|---|---|---|---|
| 2012/0320615 A1 | 12/2012 | Englert | ........................ 362/511 |
| 2015/0185391 A1 | 7/2015 | Englert | ................ G02B 6/0011 |
| 2016/0062022 A1 | 3/2016 | Wimmer et al. | ........ G02B 6/005 |
| 2016/0299278 A1 | 10/2016 | Liang | |
| 2017/0144469 A1 | 5/2017 | Franken | |
| 2019/0001878 A1* | 1/2019 | Schneider | ............. G09F 21/049 |
| 2019/0061614 A1 | 2/2019 | Neuner | .................... B60Q 3/20 |
| 2019/0346612 A1* | 11/2019 | Herlin | ................... G02B 6/0031 |
| 2020/0231090 A1 | 7/2020 | Weih | ........................ B60Q 3/54 |

(Continued)

FOREIGN PATENT DOCUMENTS

| | | |
|---|---|---|
| CN | 102791526 | 11/2012 |
| CN | 204596681 | 8/2015 |

(Continued)

OTHER PUBLICATIONS

German Search Report, in counterpart application No. 102021120154.3, Dated Apr. 13, 2022, 6 pages.

(Continued)

*Primary Examiner* — Christopher M Raabe
(74) *Attorney, Agent, or Firm* — Fattibene and Fattibene, LLC; Paul A. Fattibene

(57) ABSTRACT

A decorative part and a method for producing a decorative part, wherein the decorative part is in particular a lining part of a motor vehicle. The decorative part has a decorative coat which is provided on the rear side with a reinforcing layer and/or on the visible side with a transparent coating. In order to improve the durability or the optical properties, in particular, of a decorative part provided with a light guide for transilluminating and/or backlighting the decorative coat, the decorative part is post processed by a laser treatment.

14 Claims, 6 Drawing Sheets

(56) References Cited

U.S. PATENT DOCUMENTS

2020/0247314 A1    8/2020    Abel et al.
2021/0144872 A1    5/2021    Schenk et al. ......... H05K 5/066
2023/0366522 A1*   11/2023   Guinn .................. B60Q 1/2607

FOREIGN PATENT DOCUMENTS

| | | |
|---|---|---|
| CN | 105387408 | 3/2016 |
| CN | 106457875 | 2/2017 |
| CN | 106965533 | 7/2017 |
| CN | 107380089 | 11/2017 |
| CN | 108227283 | 6/2018 |
| CN | 207644297 U | 7/2018 |
| CN | 207644298 U | 7/2018 |
| CN | 209581360 U | 11/2019 |
| CN | 110710340 | 1/2020 |
| CN | 111479723 | 7/2020 |
| CN | 111520634 | 8/2020 |
| DE | 102012016147 | 3/2014 |
| DE | 102014100042 | 7/2015 |
| DE | 102015107705 | * 11/2015 |
| DE | 202015106328 | 11/2016 |
| DE | 102015211826 | 12/2016 |
| DE | 202017105880 | 9/2018 |
| DE | 102019009164 | 12/2021 |

OTHER PUBLICATIONS

Office Action in counterpart Chinese patent application No. 202210922287.8 dated Jan. 12, 2025, 7 pages.

Office Action in counterpart Chinese patent application No. 20221092287.8 dated Jul. 26, 2025 with English translation, 14 pages.

\* cited by examiner

DECORATIVE PART AND METHOD FOR PRODUCING SAME

FIELD OF THE INVENTION

The present invention relates to a decorative part, in particular a lining part for a motor vehicle. This decorative part has a decorative layer which is provided on the rear side with a reinforcing layer and/or on the visible side with a transparent cover.

BACKGROUND OF THE INVENTION

The reinforcing layer is usually formed by back injection molding of the decorative layer. The transparent cover on the visible side is also preferably formed by overmolding the decorative layer.

Such a decorative part is known, for example, from DE 10 2012 016 147 A1.

A decorative part within the meaning of the present invention is particularly considered as a lining part, for example for lining the dashboard, the side panels of the doors as well as the center console and possibly also for lining the steering wheel. The decorative part usually has a reinforcing layer which is formed from plastic, is preferably applied to the rear side of the decorative layer by injection molding, and has fastening means, such as fastening pins and the like, by means of which the decorative part can be connected to the supporting structure behind it in the interior of the motor vehicle. The decorative part does not necessarily have a transparent cover that can cover the visible side of the decorative layer and protect it from environmental influences. Such a transparent cover is usually formed by injection molding a transparent plastic against the visible side of the decorative side. A transparent plastic in this sense is usually crystal clear. It can also be smoky or opaque transparent, so that the visible side surface of the decorative layer provided behind the cover is visible from the outside. It is understood that the visible side of the decorative part according to the invention may be formed by the transparent cover or the visible-side surface of the decorative layer.

The decorative layer itself can be single or multilayer. It can be formed by several different materials, which are provided next to each other and/or one behind the other in the surface. The individual layers of the decorative layer can penetrate each other and end at the same level on the visible side or be contoured on the visible side or rear side so that the decorative layer does not form a flat surface on the visible side or rear side.

The decorative layer may be formed as a veneer, textile, metal or plastic layer or films, or may consist of or at least comprise combinations of the aforementioned. The individual elements of the decorative layer can have through-holes and be partially perforated. For example, one element of the decorative layer usually has through-holes in the form of a grid into which the other decorative layer is pressed when the reinforcing layer is back injection molded, so that both elements of the decorative layer are visible; cf. DE 10 2012 016 147 A1.

When producing the decorative part, the decorative layer is usually inserted into an injection mold and back injection molded with the reinforcing layer on one side, preferably first on the rear side. If realized, the transparent cover is then formed on the visible side by overmolding the still free side of the decorative layer. After demolding, the intermediate product produced in this way is brought to its final contour. For this purpose, the intermediate product is at least partially circumferentially trimmed. Usually, at least the decorative layer is larger than the later decorative part before the decorative part is produced, since the decorative layer is clamped between the two mold halves for overmolding and is thus fixed. Trimming the intermediate product exposes the decorative layer at the edge of the decorative part. This destroys any protection of the decorative layer from environmental influences that may have been provided by the overmolding.

Decorative parts of the aforementioned kind are also partially known as backlit decorative parts. For example, DE 10 2014 100 042 A1 or DE 20 2015 106 328 U1 disclose decorative parts that are provided on the rear side with a light guide element that distributes light on the rear side of the decorative part facing away from the decorative layer in order to backlight the decorative layer over as flat an area as possible. The light can also be introduced laterally via the edge, as suggested by DE 20 2017 105 880. In this context, the configuration of the decorative part can be such that the light is distributed over as flat an area as possible in the plane of the decorative layer, so that the decorative layer is uniformly backlit or transilluminated. Other configurations intend to achieve focused backlighting or light transmission through the decorative layer, which is achieved, for example, by arranging individual light sources and/or light guides on the rear side of the decorative layer. In this context, those skilled in the art strive to emit light from the decorative part only substantially orthogonally to the decorative coat, i.e. to emit the light forward. However, a light-guiding layer within the decorative part can sometimes also emit the light at the edge, which is not always desirable for design reasons.

With regard to protecting individual layers of the decorative part at the edge or suppressing light emission at the edge, it is known to post-process the edge. For example, after trimming the intermediate product, a coating pen is used to apply circumferential protection to the edge so that the layers within the decorative part are also protected from environmental influences at the edge. For higher demands on appearance or protection, a two-component or single-component coating can be applied to the edge by spray application. However, this post-processing requires masking of the decorative surface and, if necessary, of the rear side to prevent contamination of these surfaces with the spray coating. In the case of sensitive decorative surfaces which, for example, form the outer surface of the decorative part without a transparent cover, appropriate masking sometimes cannot be applied successfully. Open-pored decors prevent effective masking. The same applies to surfaces that are not smooth, such as fabric surfaces. The subsequent application of edge protection by means of coating always entails the risk of contamination of the semi-finished product, especially on the visible side, so that rejects are to be feared.

The above-mentioned possibilities of applying coating to the edges can also prevent light emission from the outer circumferential surface of the decorative part. However, the same disadvantages can be seen here as before. Coating sometimes also leads to a longer process time until the final decorative part is produced, since the coatings have to cure after application to the edge.

In the aforementioned prior art, in which a light-guiding layer is formed on the decorative part, there is a need to customize the decorative part.

SUMMARY OF THE INVENTION

The present invention is based on the problem of providing an improved decorative part of the aforementioned kind.

In this context, the present invention aims to provide a possibility to improve the edge protection and/or to enable the customization of the decorative part.

In view thereof, the present invention proposes a decorative part with the features described and a method of producing a decorative part with the features.

In the approach according to the invention, the decorative part is post-processed by laser treatment. Post-processing takes place after the individual layers of the decorative part have been formed and usually after an intermediate product of the decorative part has been trimmed to its final contour. The laser treatment is carried out, for example, along a part circumference, preferably over the entire circumference of the intermediate product. As a result, the edge of the intermediate product is post-processed by laser treatment. If the layers provided on one or both sides for this purpose are formed of plastic or contain plastic, these layers can be melted by the laser in order to seal the end face of the element of the decorative part affected by environmental influences at the edge. During the laser treatment, the melted material(s) can be melted together at the edge and thus bonded. Carbonization of individual or all materials of the decorative part can also take place at the edge, which at least significantly reduces the light transmission of the edge. In particular for the carbonization the laser beam is usually irrigated to a rim or an edge of the decorative part, which edge extends essentially perpendicular to a front surface of the decorative layer. Thus the laser beam is usually irrigated onto the edge of the decorative part in a direction essentially perpendicular to the front surface of the decorative layer. During the carbonization treatment, the decorative part may be moved around a stationary laser beam source for treating the entire edge of the decorative part. Accordingly, the laser beam will treat the entire circumferential wall defining the outer contour of the decorative part.

In this way, the plastic component of the decorative layer in particular is melted to provide an effective edge seal. At the same time, however, the laser can also locally ablate an element of the decorative part which changes its optical quality due to environmental influences, so that this element springs back slightly relative to the edge.

Consequently, the laser treatment results in edge protection. However, treating the edge with a laser also leads to micro-scarring on the surface of the edge, which also has the advantage of preventing squeak and rattle, for example, on non-illuminated components. This problem is currently being countered with an anti-squeak coating that is applied to the edge.

Post-processing by laser treatment also offers the possibility of customizing the decorative part. According to the conception of the present invention, this customization is carried out in particular on the rear side, especially on the rear side of a light guide. Here, lettering, logos, designs or the like can be applied by laser engraving. This laser post-treatment offers the possibility of creating local shading in the area of the light guide, which leads to a corresponding shadow cast on the visible side of the decorative part.

Compared with subsequent coating, laser treatment offers the advantage of a shortened production cycle. There are no drying times for any coating. In addition, the laser can be applied at a precise location so that the masking required for coating can be omitted. Due to its bundling, the laser is then precisely aligned with the edge. There is then no need to worry about the laser beam coupling into the decorative surface and altering or destroying the decorative effect there.

BRIEF DESCRIPTION OF THE DRAWINGS

Further details and advantages of the present invention will be apparent from the following description of embodiments in conjunction with the drawing. Therein.

DETAILED DESCRIPTION OF THE INVENTION

Figure 1:
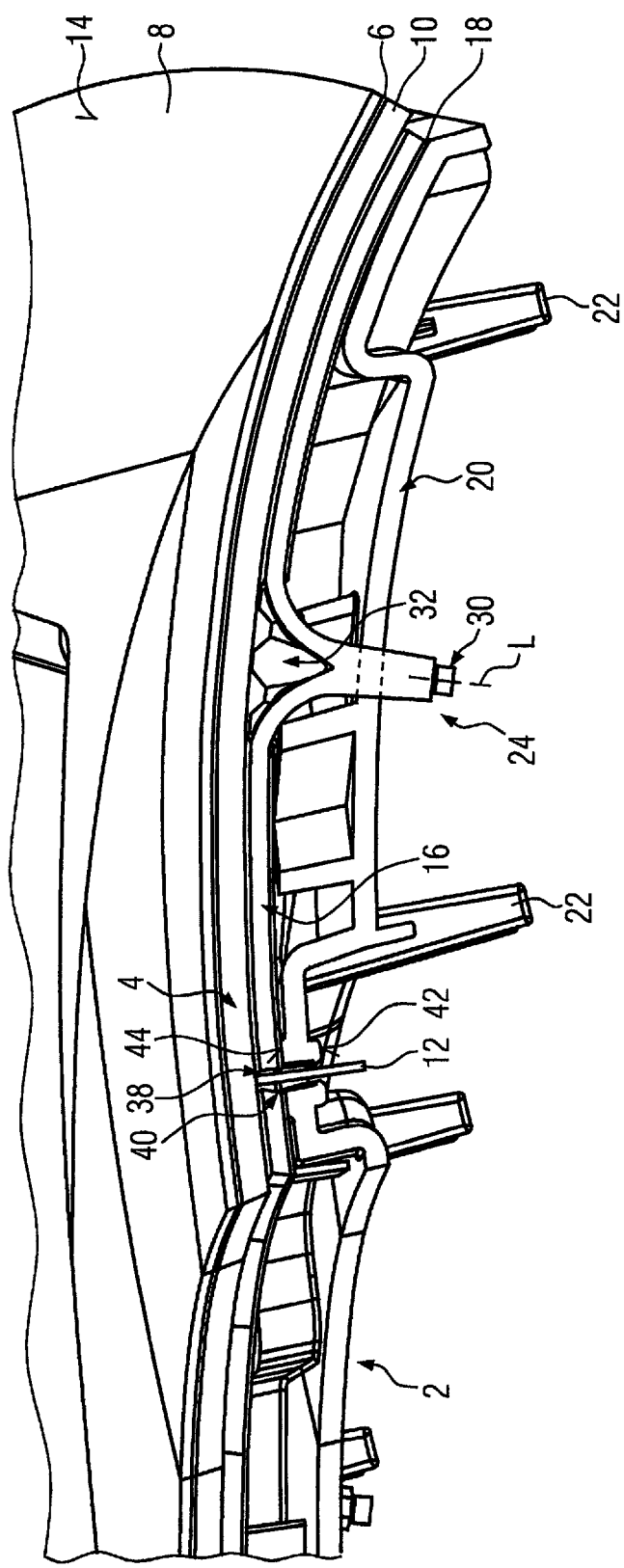
FIG. 1 shows a perspective sectional view of the embodiment.

FIG. 1 shows a decorative part 2 which is provided with a multilayer decorative coat 4. In the present case, the decorative layer consists of a double overmolded decorative layer 6. A transparent coating 8 is applied by overmolding to the front of the decorative layer 6 as a cover to protect the decorative layer 6. On the opposite rear side of the decorative layer 6, a reinforcing layer 10 is provided by injection molding. During injection molding, the reinforcing layer 10 is formed in one piece with pins 12, which will be discussed in more detail later.

The decorative layer formed in the embodiment has a front surface 14 formed by the coating 8.

A light-guiding layer 16 is arranged on the opposite rear side of the decorative coat 4. This light-guiding layer is provided for backlighting the decorative coat 4.

The light-guiding layer 16 is provided on the rear side with a reflector film 18 forming a reflector layer.

The light-guiding layer 16 is provided between the multilayer decorative coat 4 and a substrate 20, which also serves as a rear side cover and forms fastening pins 22 for fastening the substrate 20 and thus the decorative part 2 to a chassis of a vehicle.

As can be seen in FIG. 1, a light guide in the form of a light guide dome characterized by reference sign 24 extends through the substrate 20. This light guide dome 24 has a column segment 26 and a funnel section 28 and carries an LED as a light element 30 at its free end. While the column segment 26 is formed of solid material and is formed as a slightly conically widening light guide which emits the light generated by the light element 30 substantially at right angles to the decorative coat 4, the funnel section 28 acts as a light guide which deflects the light from this right-angled alignment along a central longitudinal axis L of the light guide dome 24 so that it is emitted parallel to the plane of the light-guiding layer 16 into this layer 16.

The funnel section 28 surrounds a shading element 32, which is provided between the column segment 26 and the decorative coat 4 and is rotationally symmetrical in the present case.

Figure 2:
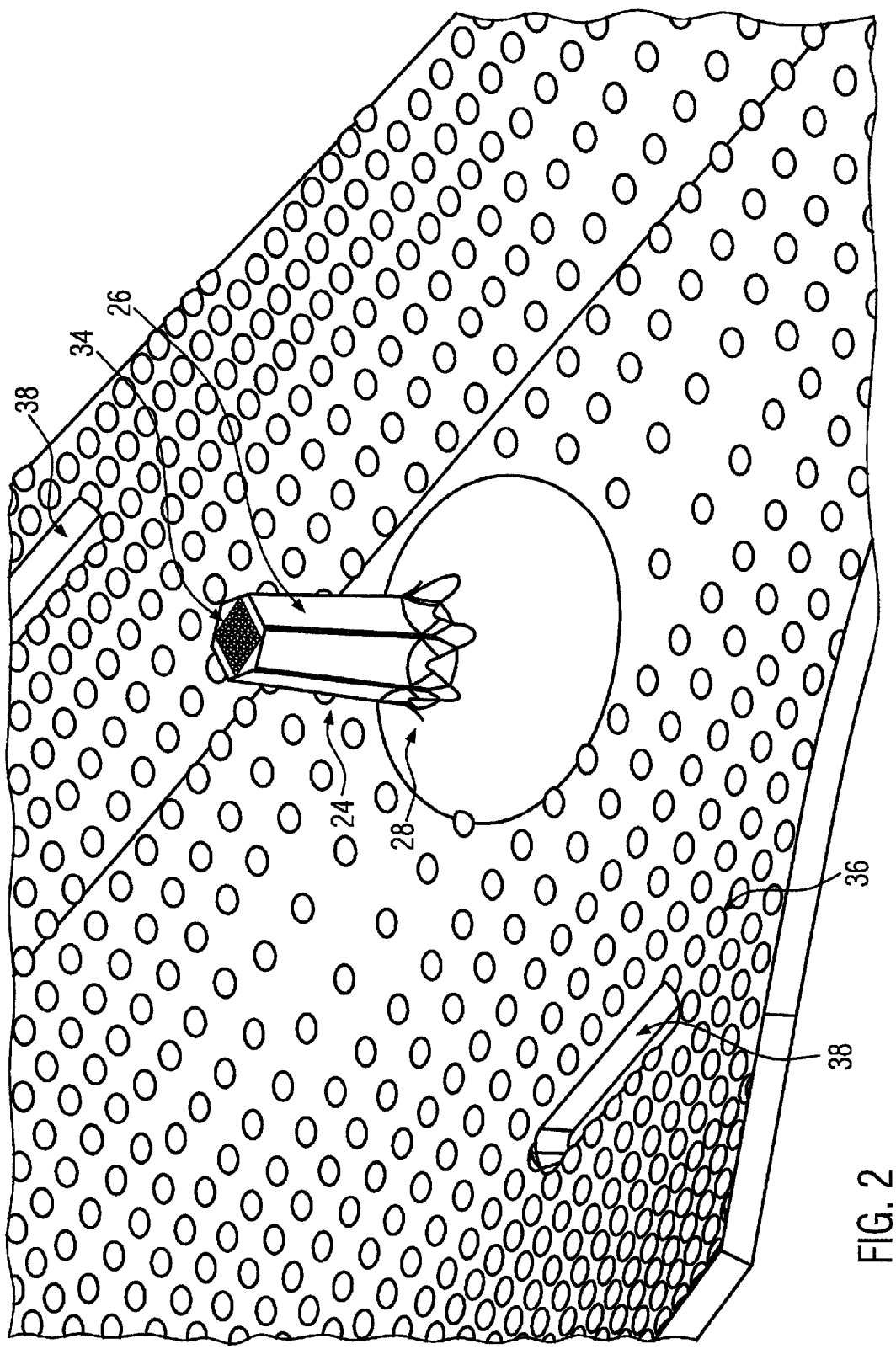
FIG. 2 shows a top view of the rear side of the light-guiding layer of the embodiment.
Figure 3:
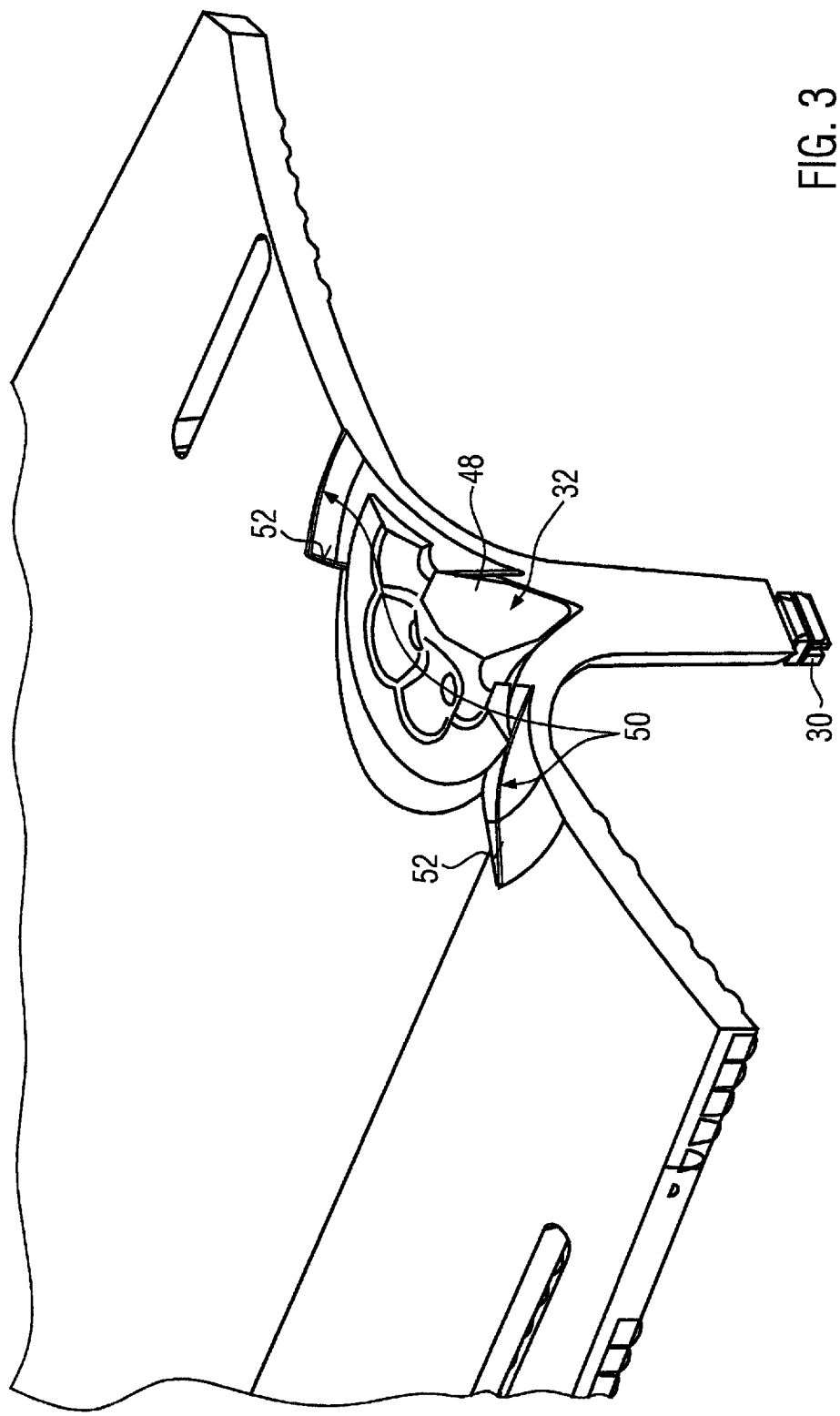
FIG. 3 shows a top view of the front side of the light-guiding layer.

Details of the light guide dome 24 can be seen in FIGS. 2 and 3. FIG. 2 shows a shadow pattern 34 formed at the free end of the column segment 26 by means of laser treatment, against which the LED 30 is placed with its light-emitting surface. This shadow pattern 34 is illuminated by the LED 30. This results in a corresponding shadow pattern on the front surface 14. By laser treatment, for example, a lettering or a logo can be applied, which appears as a corresponding shadow pattern on the front surface 14. This makes it possible to customize the decorative part 2.

FIG. 2 further shows a structural grid 36 provided on the rear side of the light-guiding layer 16 and comprising a plurality of spherical caps with a radius of 1 mm and a height of 0.34 mm. This structural grid 36 serves to emit light in the direction of the decorative coat 4. FIG. 2 further shows longitudinal slits 38, to which corresponding longitudinal slits 40 are cut out on the substrate 20. As FIG. 1 illustrates, the pin 12 protrudes through the longitudinal slits 38, 40, which are to be regarded as pin openings in the sense of the present invention. FIG. 1 shows the pin 12 before hot caulking. After hot caulking, the free end of the pin 12 is plastically deformed and abuts against a locking surface 42 formed on the rear side of the longitudinal slit 40. On the opposite side, the substrate 20 forms a supporting surface 44 against which the flat light-guiding layer 16 abuts over a relatively full area, so that the tensile force caused by the caulked pin 12 does not result in any deformation of the light-guiding layer 16 that could impair the light-guiding properties of the layer 16.

The free end region of the light guide dome 24, formed primarily by the pillar or column segment 26, is hexagonal to optimize color mixing when using an RGB LED as a lighting element.

As FIG. 3 illustrates, the shading element 32 is in the form of an injection-molded funnel which has a plurality of bores 46 distributed around its circumference, each of which tapers off towards the decorative coat 4 in the form of a funnel. The bores 46 serve as apertures that partially absorb and partially transmit and thereby scatter the light emitted from the light guide dome 24 toward the decorative coat 4, so that it emerges scattered from the shading element 32 on the front surface thereof facing the decorative coat 4. The shading element 32 has a cone-shaped projection 48 positively coupled to the tapered end portion of the funnel section 28 and positioned centrally with respect to the central longitudinal axis L.

Figure 4:
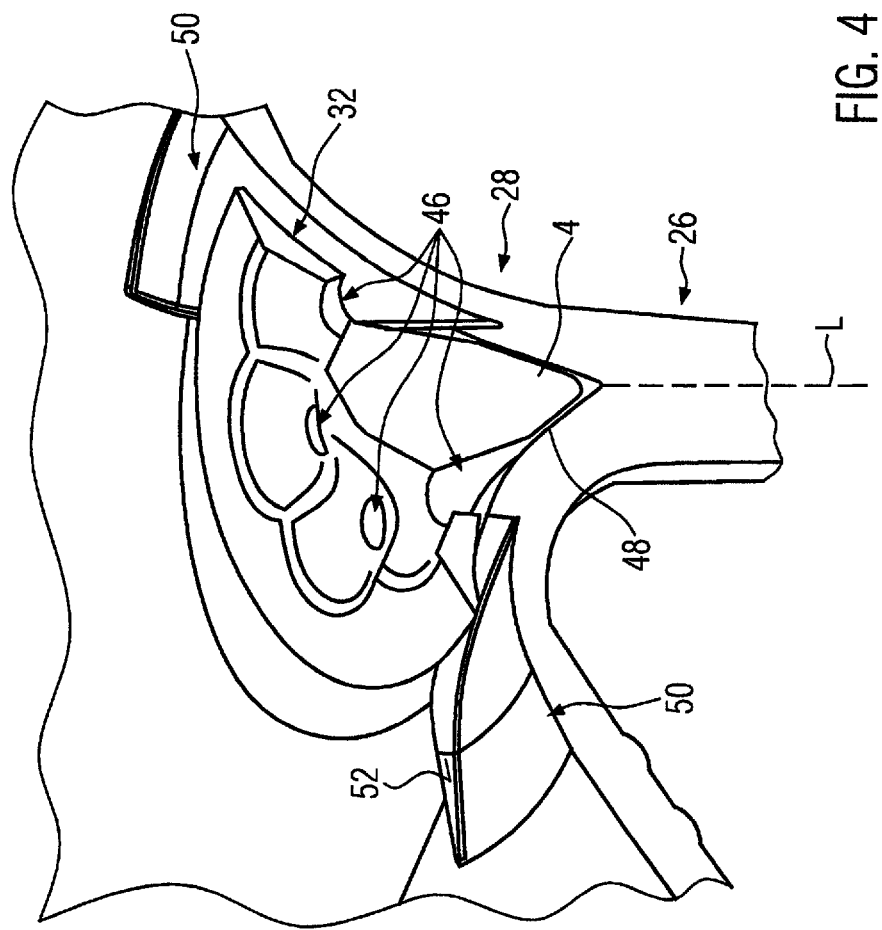
FIG. 4 shows an enlarged detail of the view according to FIG. 3.

As FIG. 4 illustrates, the shading element 32 extends radially to above a reflector identified by reference sign 50, which has a crescent-shaped course in top view and is thus provided partly below the shading element 32 and partly radially outside it, and the reflector surface 52 of which extends substantially parallel to the longitudinal center axis L.

The production of the embodiment shown in the Figures is as follows: First, the decorative layer 6 is back injection molded with the reinforcing layer 10 and then overmolded with the coating 8 on the visible side to obtain the decorative coat 4 together with the pins 12. In parallel, for example, injection molding is used to form the light-guiding layer 16 as a unitary component together with the light guide dome 24. It is understood that multiple light guide domes 24 may be provided depending on the size of the light-guiding layer 16. Then, with recessing of a substantial part of the light guide domes 24, the reflector film 18 is applied against the rear side of the light guide layer 16 and joined thereto, in particular glued. These components are joined to the substrate 20, which is produced separately by means of injection molding, by aligning the two longitudinal slits 38, 40 with respect to one another and passing them through with the pin 12. This is melted to its end projecting beyond the substrate 20, resulting in a thickened region that abuts against the locking surface 42. Typically, only then is the LED glued on and wired for power. This wiring can be done via a printed circuit board that electrically connects a plurality of LEDs 30, and can be provided on the rear side of the substrate 20 and/or abut on the rear side of the substrate 20.

Figure 5:
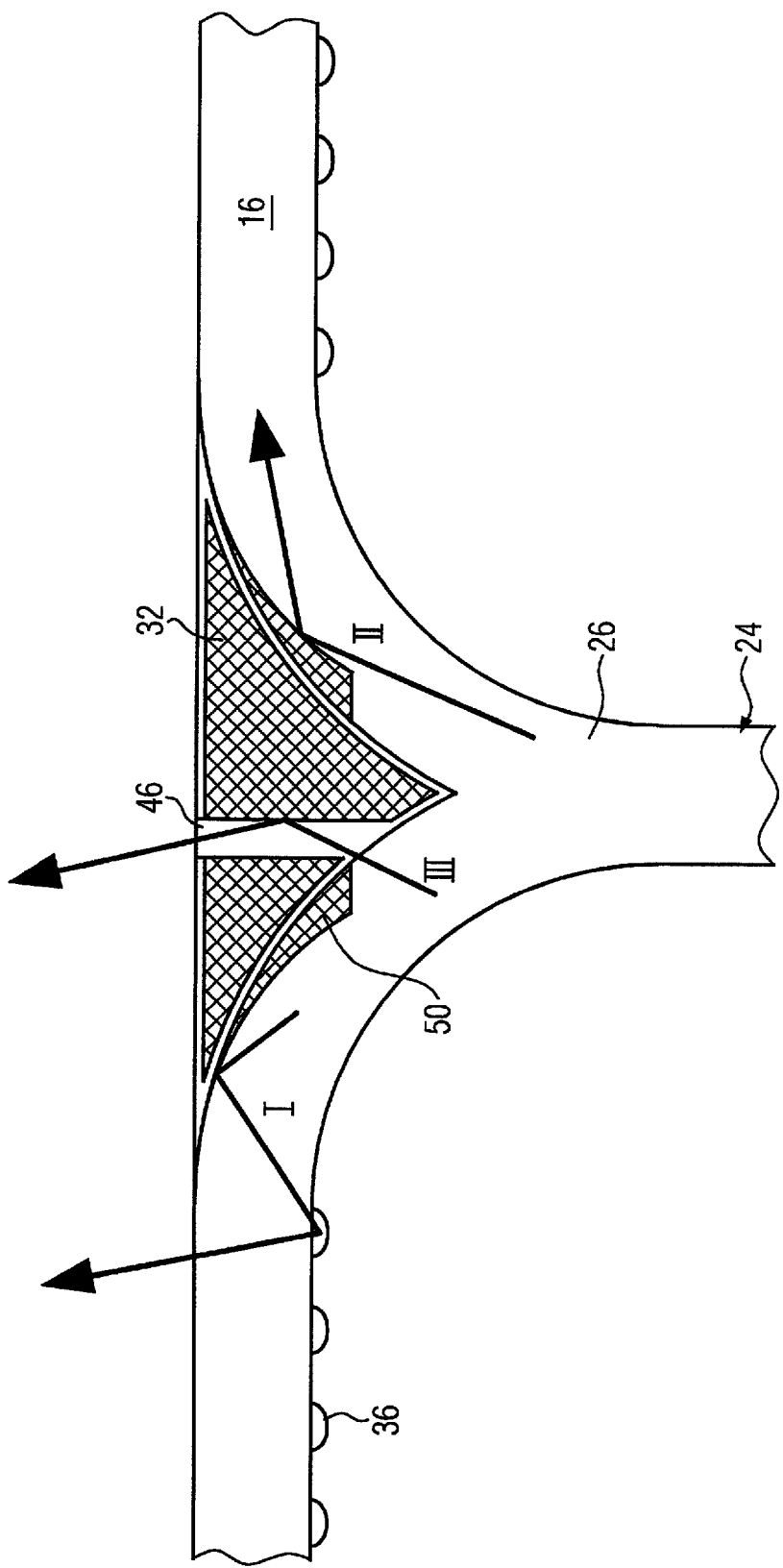
FIG. 5 shows a longitudinal sectional view through a light guide dome of the embodiment with some beam paths.

FIG. 5 shows a sectional view of a light guide dome 24 with beam paths. For example, light rays directed via the column segment 26 reach the reflector 50 and are reflected at its surface. The ray path, identified by reference sign I, strikes the reflector 50 at a relatively acute angle and is reflected by a segment of the structural grid 36 immediately adjacent the funnel section and is emitted through the front surface of the light-guiding layer 16.

The light beam, identified by reference sign II, strikes the surface of reflector 50 at a relatively obtuse angle and is passed through the light-guiding layer 16 substantially parallel thereto.

The light beam, identified by reference sign III, passes through the bore 46 and is reflected within the bore and emitted in the direction of the decorative layer 6.

These and other reflection effects result in uniform backlighting of the decorative layer 6.

Figure 6:
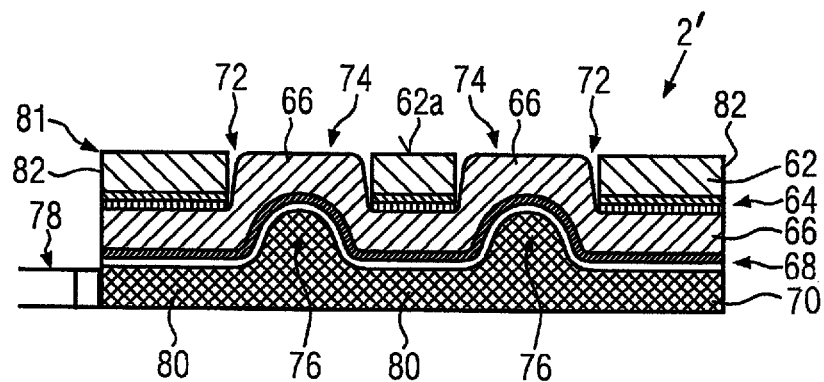
FIG. 6 shows a sectional view of a second embodiment.

In FIG. 6, reference sign 62 identifies a second decorative coat that forms a visible surface 62a that can be provided with a transparent layer as a coating, which is not shown. Opposite the visible side surface 62a is a lamination 64, which is joined to a rear side surface of the second decorative coat 62 in a first lamination step. In a top view of the embodiment or the visible side 62a, a first decorative layer 66 is provided behind the first lamination 64. This first decorative layer 66 is formed as a continuous decorative layer. In the viewing direction behind it, there is a second lamination 68 which connects the first decorative layer 66 to a reinforcing layer 70.

The second decorative coat 62 is provided with a plurality of through-holes 72. These through-holes are formed before the reinforcing layer 70 is formed. Before forming the reinforcing layer 70, the first decorative layer 66 and the second decorative coat 62 each lie on top of one another as a flat decorative layer. The injection molding of the reinforcing layer 70 forces surface portions 74 of the first decorative layer 66 into the through-holes 72, so that these surface portions 74 lie in the plane of the second decorative coat 62. This situation is shown in FIG. 6. As a result of the receding of the first decorative layer 66 in the direction of the through-holes 72, projections are formed by the material of the reinforcing layer 70 which act as optical lenses and are characterized in the drawing by reference sign 76. In the embodiment shown, the through-holes 72 have an edge geometry that extends orthogonally from the visible surface. Thus, the through-holes 72 are formed as cylindrical through-holes.

Reference sign 78 indicates a light source that introduces light laterally into the reinforcing layer 70, which in the embodiment acts as a light guide.

This results in a specific emission of the incident light in the region of the projections 76. The projections 76 emit a higher proportion of light from the reinforcing layer 70 than flat segments 80, which are arranged between the projections 76 and extend parallel to the rear side of the second decorative coat 62. In these regions, this decorative molding has a strictly plane-parallel layered structure in which the layers of the first and second decorative coats 62, 66 and bonding agent layers 64, 68 provided therebetween and the flat segments 80 of the reinforcing layer 70 extend parallel to each other.

The projections 76 project from the flat segments 80 with their flank surfaces directed obliquely towards each other.

In FIG. 6, reference sign 82 identifies an edge protection applied to a circumferential edge 81, which almost completely surrounds the decorative part 2'. The laser treatment causes carbonization of at least the plastic reinforcing layer 70. The edge protection 82 covers the entire edge from the visible side of the second decorative coat 62 to the lower side of the reinforcing layer 70 and accordingly seals all decorative coats 62, 66 circumferentially. Only in the region of the light source 78 is the edge protection 82 removed by post-treatment, so that the light source 78 can inject light into the reinforcing layer 70.

Figure 7:
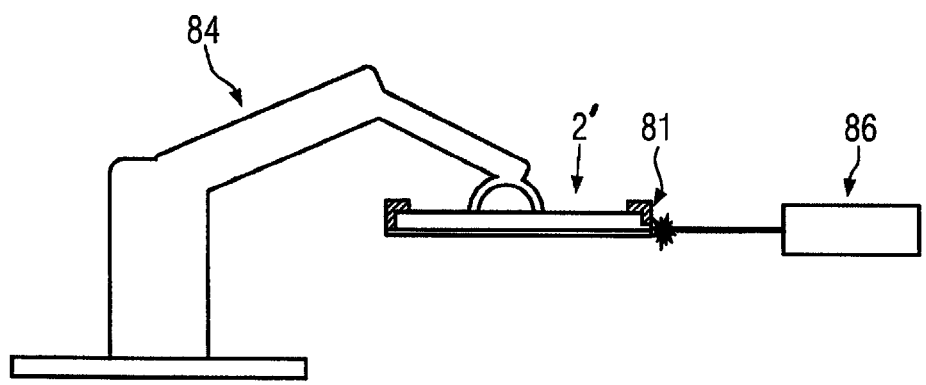
FIG. 7 shows a schematic view of the decorative part during post-treatment by laser.

FIG. 7 shows an example of production of the edge protection. A robot 84 handles the decorative part 2' and positions it relative to a fixed laser source 86, which applies the edge protection 82 by laser post-processing.

As a result of this laser post-processing, light is not emitted from the light-guiding layer. The decorative part 2 is shaded at the edge and does not emit any light at the edge.

LIST OF REFERENCE SIGNS 2 decorative part
4 decorative coat
6 decorative layer
8 coating
10 reinforcing layer
12 pin
14 front surface
16 light-guiding layer
18 reflector film
20 substrate
22 fastening pin
24 light guide dome
26 column segment
28 funnel section
30 light element/LED
32 shading element
34 shadow pattern
36 structural grid
38 longitudinal slit
40 longitudinal slit
42 locking surface
44 supporting surface
46 bore
48 cone-shaped projection
50 reflector
52 reflector surface
L center longitudinal axis of the light guide dome
2' decorative part
62 second decorative coat
62a visible side surface
64 bonding agent layer/first lamination
66 first decorative coat
68 second lamination/bonding agent layer
70 reinforcing layer
72 through-hole
74 surface portion
76 projection
78 light source
80 flat segment of the reinforcing layer 10
81 edge
82 edge protection
84 robot
86 laser source

What is claimed is:

1. Method for producing a decorative part, in which a decorative coat is provided on a rear side of the decorative part on a light transmitting reinforcing layer, an intermediate product produced in this way is trimmed to produce a final contour having an edge and then laser-processed with a laser directed at the edge forming carbonized material at the edge to reduce light transmission at the edge.

2. Method according to claim 1, wherein the carbonized material forms an edge protection.

3. Method according to claim 1, wherein a light guide provided on the rear side for transilluminating or backlighting the decorative coat is laser-processed.

4. Method according to claim 1, wherein:
the laser processing results in light not being emitted from the edge.

5. A method for producing a decorative part comprising the steps of:
providing a first decorative coat on a surface of a light transmitting layer of the decorative part forming an intermediate product;
trimming the intermediate product producing a final contour having an edge; and
processing the final contour with a laser directed at the edge reducing light transmission of the light transmitting layer at the edge of the final contour of the intermediate product.

6. A method for producing a decorative part as recited in claim 5 wherein:
said step of processing the final contour with a laser comprises carbonization of material at the edge.

7. A method for producing a decorative part as recited in claim 5 wherein:
the light transmitting layer is a reinforcing layer on a rear side of the decorative part.

8. A method for producing a decorative part as recited in claim 7 further comprising the steps of:
laser processing a light guide forming a shadow pattern; and
providing the light guide on the rear side of the decorative part,
whereby the first decorative coat is capable of being illuminated.

9. A method for producing a decorative part as recited in claim 5 further comprising the steps of:
providing a light guide on a rear side of the decorative part for illuminating the first decorative coat; and
laser-processing the light guide for applying a shadow pattern.

10. A method for producing a decorative part as recited in claim 5 wherein:
said step of processing the final contour with a laser results in light not being emitted from the light transmitting layer at the edge.

11. A method for producing a decorative part as recited in claim 5 further comprising: prior to said step of providing the first decorative coat on the surface and said step of processing the final contour with the laser, forming a second decorative coat having through holes on the first decorative coat; and molding the intermediate product forming projections with the first decorative coat extending into the through holes.

12. A method for producing a decorative part as recited in claim 11 wherein: the intermediate product comprises a light guide and the projections comprise optical lenses.

13. A method for producing a decorative part as recited in claim 12 further comprising the step of: placing a light source adjacent an edge of the intermediate product.

14. A method for producing a decorative part as recited in claim 7 further comprising the step of: providing a transparent coating on a visible side of the decorative part.

* * * * *